(12) United States Patent  (10) Patent No.: US 10,583,736 B2
Cardona                    (45) Date of Patent:    Mar. 10, 2020

(54) SYSTEM FOR CONTROLLING A DRIVE OPERATION OF A MACHINE

(71) Applicant: Caterpillar Inc., Peoria, IL (US)

(72) Inventor: Jose M. Cardona, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 15/837,936

(22) Filed: Dec. 11, 2017

(65) Prior Publication Data

US 2019/0176621 A1    Jun. 13, 2019

(51) Int. Cl.
*B60K 28/08* (2006.01)
*B60W 10/10* (2012.01)
*B60W 10/18* (2012.01)
*B60W 30/18* (2012.01)
*B60P 1/04* (2006.01)

(52) U.S. Cl.
CPC ............. *B60K 28/08* (2013.01); *B60P 1/04* (2013.01); *B60W 10/10* (2013.01); *B60W 10/18* (2013.01); *B60W 30/18027* (2013.01); *B60W 2300/125* (2013.01); *B60W 2530/10* (2013.01); *B60W 2710/10* (2013.01); *B60W 2710/18* (2013.01)

(58) Field of Classification Search
CPC ....... B60W 30/18027; B60W 2530/10; B60W 2710/10; B60W 2530/18
See application file for complete search history.

(56) References Cited

U.S. PATENT DOCUMENTS

| | | | |
|---|---|---|---|
| 4,614,477 A * | 9/1986 | Hagenbuch | B65D 90/48 116/227 |
| 4,921,578 A | 5/1990 | Shiraishi et al. | |
| 6,953,410 B2 * | 10/2005 | Wheeler | F16H 61/0213 475/115 |
| 7,633,021 B2 * | 12/2009 | Pfohl | E02F 9/26 177/141 |
| 7,818,140 B2 * | 10/2010 | Dreier | F16H 61/0213 177/136 |
| 9,182,033 B2 * | 11/2015 | Mair | F16H 59/52 |
| 9,221,659 B2 * | 12/2015 | Fukasu | E02F 9/26 |
| 2004/0025617 A1 | 2/2004 | Fowler et al. | |
| 2009/0095539 A1 | 4/2009 | Pfohl et al. | |
| 2009/0192760 A1 | 7/2009 | Dreier et al. | |
| 2014/0121912 A1 | 5/2014 | Mair et al. | |
| 2014/0231153 A1 | 8/2014 | Fukasu et al. | |
| 2017/0191865 A1 | 7/2017 | Kvist | |

FOREIGN PATENT DOCUMENTS

JP     2008-201401 A    9/2008

* cited by examiner

*Primary Examiner* — David R Morris
(74) *Attorney, Agent, or Firm* — Leydig, Voit & Mayer, Ltd.

(57) ABSTRACT

A system for controlling a drive operation of a machine having a payload container. A controller is configured to determine a current payload disposed in the payload container based upon a load sensor and determine a number of completed material loading cycles of a work implement. The controller is further configured to determine an estimated number of material loading cycles required to load the payload container based upon a desired payload, the current payload, and the number of completed material loading cycles, and compare the number of completed material loading cycles to the estimated number of material loading cycles. After the number of completed material loading cycles is one or less than the estimated number of material loading cycles, a shifting operation may begin to shift the transmission into the drive gear.

20 Claims, 6 Drawing Sheets

FIG. 6

SYSTEM FOR CONTROLLING A DRIVE OPERATION OF A MACHINE

TECHNICAL FIELD

This disclosure relates generally to machines for hauling material and, more particularly, to a system and method for controlling a drive operation of a machine for hauling material.

BACKGROUND

Machines for hauling material such as load or haul trucks are used to perform tasks at a work site such as moving material. The machines for hauling material may operate in an autonomous, semi-autonomous, or manual manner to perform the tasks in response to commands generated as part of a work plan for the machines. Autonomously and semi-autonomously operated machines may increase productivity and permit operation in environments that are unsuitable or undesirable for a human operator. Autonomous or semi-autonomous systems may also compensate for inexperienced human operators as well as inefficiencies associated with repetitive tasks.

During a material loading process, the machines for hauling material typically remain stationary at a loading location. In order to reduce wear on components of the machine transmission such as a torque converter as well as wear on the service brakes, the transmission is often set to neutral during the loading process. In some instances, the process of shifting the transmission into a drive gear from neutral may take a relatively long period of time.

U.S. Patent Publication No. 2009/0192760 discloses a vehicle mass estimation system for use in a vehicle including a tractor, a trailer, and a transmission. A signal device may indicate whether a trailer is attached to the tractor and estimate a vehicle mass. A desired gear ratio may be selected based upon the vehicle mass.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for controlling a drive operation of a machine includes a payload container, a load sensor, a transmission, and a controller. The payload container is disposed on the machine and is operative to haul a material. The load sensor is configured to generate load signals indicative of a load. The transmission is operative to control propulsion of the machine and includes a drive gear. The controller is configured to access a desired payload of the payload container, receive load signals from the load sensor, determine a current payload disposed in the payload container based upon the load signals, and determine a number of completed material loading cycles of a work implement, with the work implement being used to load the payload container. The controller is further configured to determine an estimated number of material loading cycles of the work implement required to load the payload container until the payload container reaches the desired payload based upon the desired payload of the payload container, the current payload, and the number of completed material loading cycles, compare the number of completed material loading cycles to the estimated number of material loading cycles, and after the number of completed material loading cycles is one or less than the estimated number of material loading cycles, generate a command signal to begin a shifting operation to shift the transmission into the drive gear.

In another aspect, a method of controlling a drive operation of a machine includes accessing a desired payload of a payload container disposed on the machine and operative to haul a material, receiving load signals from a load sensor indicative of a load, determining a current payload disposed in the payload container based upon the load signals, and determining a number of completed material loading cycles of a work implement, with the work implement being used to load the payload container. The method further includes determine an estimated number of material loading cycles of a work implement required to load the payload container until the payload container reaches the desired payload based upon the desired payload of the payload container, the current payload, and the number of completed material loading cycles, comparing the number of completed material loading cycles to the estimated number of material loading cycles, and after the number of completed material loading cycles is one or less than the estimated number of material loading cycles, generating a command signal to begin a shifting operation to shift a drive gear of a transmission, the transmission being operative to control propulsion of the machine.

In still another aspect, a machine includes a prime mover, drive wheels, a transmission, a payload container, a load sensor, and a controller. The transmission is operatively connected to the prime mover and the drive wheels to control propulsion of the machine and includes a drive gear. The payload container is disposed on the machine and is operative to haul a material. The load sensor is configured to generate load signals indicative of a load. The controller is configured to access a desired payload of the payload container, receive load signals from the load sensor, determine a current payload disposed in the payload container based upon the load signals, and determine a number of completed material loading cycles of a work implement, with the work implement being used to load the payload container. The controller is further configured to determine an estimated number of material loading cycles of the work implement required to load the payload container until the payload container reaches the desired payload based upon the desired payload of the payload container, the current payload, and the number of completed material loading cycles, compare the number of completed material loading cycles to the estimated number of material loading cycles, and after the number of completed material loading cycles is one or less than the estimated number of material loading cycles, generate a command signal to begin a shifting operation to shift the transmission into the drive gear.

DETAILED DESCRIPTION

Figure 1:
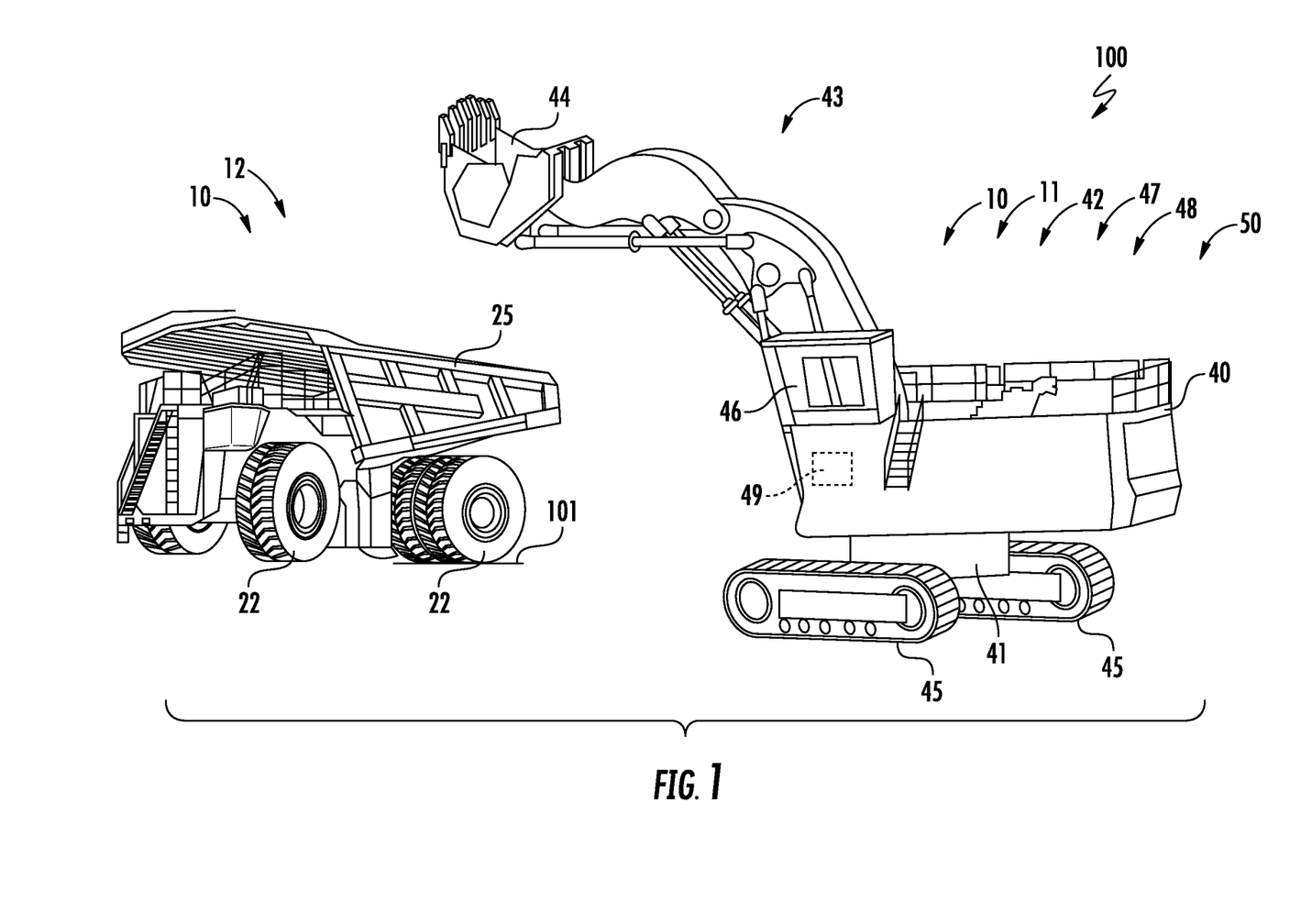
FIG. 1 depicts a schematic illustration of a hydraulic shovel loading a haul truck including systems in accordance with the disclosure.

FIG. 1 illustrates a portion of an exemplary work site 100 at which a plurality of mobile machines 10 may operate in an autonomous, a semi-autonomous, or a manual manner. Work site 100 may include, for example, a mine site, a landfill, a quarry, a construction site, a road work site, or any other type of work site. Machines 10 may perform any of a plurality of desired operations or tasks at work site 100 such as excavating earthen material from a dig site and loading it onto a nearby target. As depicted, work site 100 includes a material loading machine such as a hydraulic shovel 11 used to load material onto a plurality of machines such as haul truck 12. After each haul truck 12 is filled to a desired level, the haul truck 12 may travel to a dump location before returning to be filled again.

As used herein, a machine 10 operating in an autonomous manner operates automatically based upon information received from various sensors without the need for human operator input. As an example, a load or haul truck that automatically follows a path from one location to another and dumps a load at an end point may be operating autonomously. A machine operating semi-autonomously includes an operator, either within the machine or remotely, who performs some tasks or provides some input, and other tasks are performed automatically and may be based upon information received from various sensors. As an example, a haul truck that automatically follows a path from one location to another but relies upon an operator command to dump a load may be operating semi-autonomously. In another example of a semi-autonomous operation, an operator may dump a bucket of an excavator in a haul truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
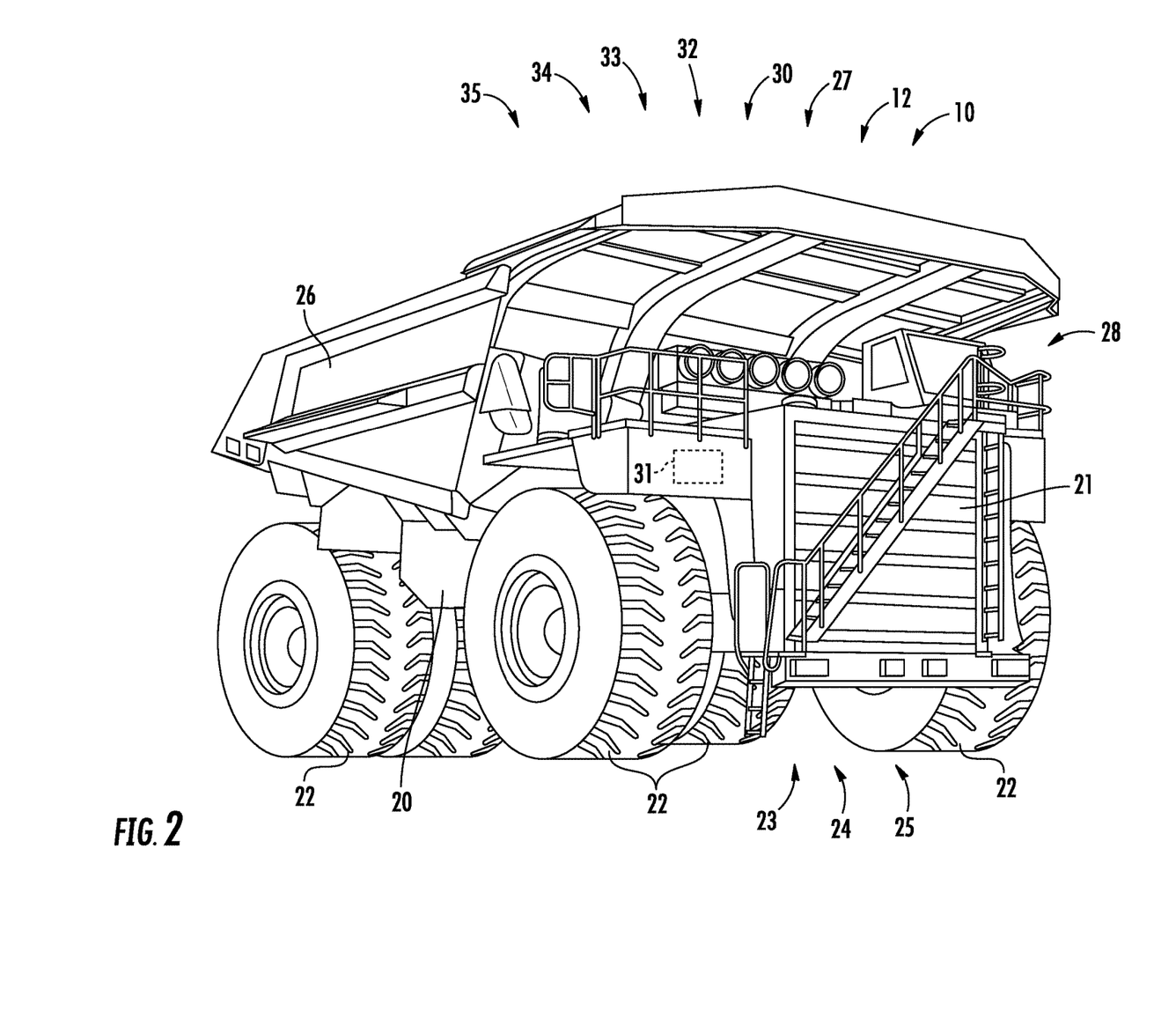
FIG. 2 depicts a diagrammatic illustration of the haul truck of FIG. 1.

FIG. 2 depicts a diagrammatic illustration of a haul truck 12 for hauling or transporting material. The haul truck 12 includes a frame 20, and a prime mover such as engine 21 may be operatively connected to drive wheels 22 by through a transmission indicated generally at 23 to propel the machine. The haul truck 12 may use any type of machine propulsion and drivetrain mechanisms including hydrostatic, electric, or a mechanical drive. Regardless of the type or configuration, the transmission 23 may include or be configured to operate as if it includes at least one drive gear generally indicated at 24.

Service brakes generally indicated at 25 may be provided to assist in slowing, stopping, and otherwise controlling the braking of the haul truck 12. A payload container 26 is mounted on frame 20 and configured to carry material. The payload container 26 may be pivotally mounted and configured with an open top to permit material to be loaded therein from above the payload container. Actuators such as hydraulic cylinders generally indicated at 27 may extend between the frame 20 and the payload container 26. The actuators may be actuated to dump the material that is within the payload container 26 as desired. Haul truck 12 may include a cab 28 for an operator to physically occupy and provide input to control the machine.

Haul truck 12 may be controlled by a control system 30 as shown generally by an arrow in FIG. 2 indicating association with the machine. The control system 30 may include an electronic control module or controller 31 and a plurality of sensors. The controller 31 may control the operation of various aspects of the haul truck 12 including the drivetrain and the hydraulic systems.

The controller 31 may be an electronic controller that operates in a logical fashion to perform operations, execute control algorithms, store, retrieve, and access data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 31 such as power supply circuitry, signal conditioning circuitry, driver circuitry, and other types of circuitry.

The controller 31 may be a single controller or may include more than one controller disposed to control various functions and/or features of the haul truck 12. The term "controller" is meant to be used in its broadest sense to include one or more controllers and/or microprocessors that may be associated with the haul truck 12 and that may cooperate in controlling various functions and operations of the machine. The functionality of the controller 31 may be implemented in hardware and/or software without regard to the functionality. The controller 31 may rely on one or more data maps relating to the operating conditions and the operating environment of the haul truck 12 and the work site 100 that may be stored in the memory of or associated with the controller. Each of these data maps may include a collection of data in the form of tables, graphs, and/or equations.

The control system 30 and controller 31 may be located on the haul truck 12 as an on-board control system, or may be distributed with components such as an off-board controller also located remotely from or off-board the machine and located at the work site 100 or off-site. The functionality of control system 30 may be distributed so that certain functions are performed at haul truck 12 and other functions are performed remotely.

Control system 30 may include a payload estimation system generally indicated at 32 in FIG. 2 that operates to provide an estimation of the mass of a payload carried by the payload container 26 of the haul truck 12. The payload estimation system 32 may determine an estimate of the payload in any desired manner. In one example, the payload estimation system 32 may include load sensors, generally indicated at 33, configured to generate load signals indicative of the current payload in the payload container 26. In an embodiment, the load sensors may be configured as one or more pressure sensors operative to sense the pressure within the hydraulic cylinders 27 associated with the payload container 26. In such case, the pressure sensors may generate pressure signals indicative of the pressure in hydraulic cylinders 27 and the payload estimation system 32 may determine the current payload within the payload container 26 based upon the pressure signals. The term "sensor" is meant to be used in its broadest sense to include one or more sensors and related components that may be associated with the haul truck 12 and that may cooperate to sense various functions, operations, and operating characteristics of the element of the machine and/or aspects of the environment in which the machine is operating. Other types of load sensors 33 are contemplated.

The payload estimation system 32 may operate by determining the pressure within the hydraulic cylinders and mapping or otherwise associating the sensed pressure to or with the payload within the payload container 26. In other words, by utilizing load sensor 33 to monitor the pressure within the hydraulic cylinders, the payload estimation system 32 may determine or estimate the current payload disposed within the payload container 26. Other types of sensors and other manners of determining the payload within the payload container 26 are contemplated.

The controller 31 may also include a loading cycle count system generally indicated at 34 in FIG. 2 that operates to monitor the material loading process and determine an estimated number of material loading cycles or passes required to fill the haul truck 12 to a desired extent (e.g., full). In doing so, the loading cycle count system 34 may make such a determination without input from the machine 10 loading the haul truck 12 and regardless of the type of the machine performing the material loading operations, the type of work implement or tool used by the loading machine, and the type of material being loaded into the haul truck.

More specifically, the loading cycle count system 34 operates by determining a required tool count estimate (RTCE) corresponding to the number of material loading cycles required to fill the payload container 26 after each material loading cycle. The required tool count estimate (RTCE) may be expressed as:

$$RTCE = \frac{Payload_{desired}}{Payload_{current}} \cdot \text{load count}$$

where $Payload_{desired}$ is the desired or maximum payload for the haul truck 12, $Payload_{current}$ is the current payload within the payload container 26 of the haul truck, and load count is the number of loading cycles that have been performed to reach the current payload of the haul truck. It should be noted that as the number of material loading cycles increases, the accuracy of the required tool count estimate (RTCE) may increase due to the greater sample size.

The control system 30 may also include a shift control system generally indicated at 35 in FIG. 2 configured to determine when to shift the transmission 23 into a drive gear 24. The shift control system 35 may be configured to monitor the material loading process and determine when only one more material loading cycle or pass is required to fill the haul truck 12 to a desired extent (e.g., full). More specifically, the shift control system 35 may receive information from the loading cycle count system 34 to determine the estimated number of material loading cycles required to fill the haul truck 12 and monitor the number of material loading cycles that have been performed. Upon completing the second to last material loading cycle, the shift control system 35 may generate a command signal to begin the gear shift process. The gear shift process may include shifting the transmission 23 into a drive gear 24, such as first gear, and engaging the service brakes 25 or ensuring that the service brakes are engaged so that the haul truck 12 remains stationary at its loading position. Upon completing the final material loading cycle, the shift control system 35 may disengage the service brakes 25 so that the fully loaded haul truck 12 is driven to a dump location.

The loading cycle count system 34 may be used as the payload container 26 of haul truck 12 is filled regardless of the type of machine used to load the haul truck 12. In one example, a hydraulic shovel 11 as depicted in FIG. 1 may be used to load the haul truck 12. Hydraulic shovel 11 may include a swing member or platform 40, an undercarriage 41, a prime mover 42, and an implement system 43 including a work implement or tool such as a bucket 44. Platform 40 may be rotatably disposed on undercarriage 41 which supports one or more ground-engaging traction devices such as tracks 45 to allow translational motion of hydraulic shovel along a work surface 101. The hydraulic shovel 11 may include an operator station 46 from which an operator may control the operation of machine 10. The prime mover 42 may provide power for the operation of machine 10 including the implement system 43 to move material from one location to another.

The hydraulic shovel 11 may include a system such as an electro-hydraulic system generally indicated at 47 for operating various systems and components of the machine such as rotation of the platform 40, operation of the implement system 43, and operation of the tracks 45. As with haul truck 12, hydraulic shovel 11 may include a control system indicated generally at 48 and a controller 49 similar to those of the haul truck 12 and the descriptions thereof are not repeated.

Although the tracks 45 allow translational motion of hydraulic shovel 11 along the work surface 101, many typical material moving operations involve the rotation of the platform 40 between dig and dump locations with the bucket 44 loading material at the dig location and unloading material at the dump location. More specifically, the hydraulic shovel 11 is rotated so that the bucket 44 is positioned at a dig or loading location at the work site 100. The hydraulic shovel 11 performs a digging operation to fill the bucket 44 with material and then rotates to a position above the payload container 26. Once at the desired position above the payload container 26, a dump operation is performed to empty the contents of bucket 44 into the payload container. This process may be repeated until the haul truck 12 is filled to a desired extent.

Figure 3:
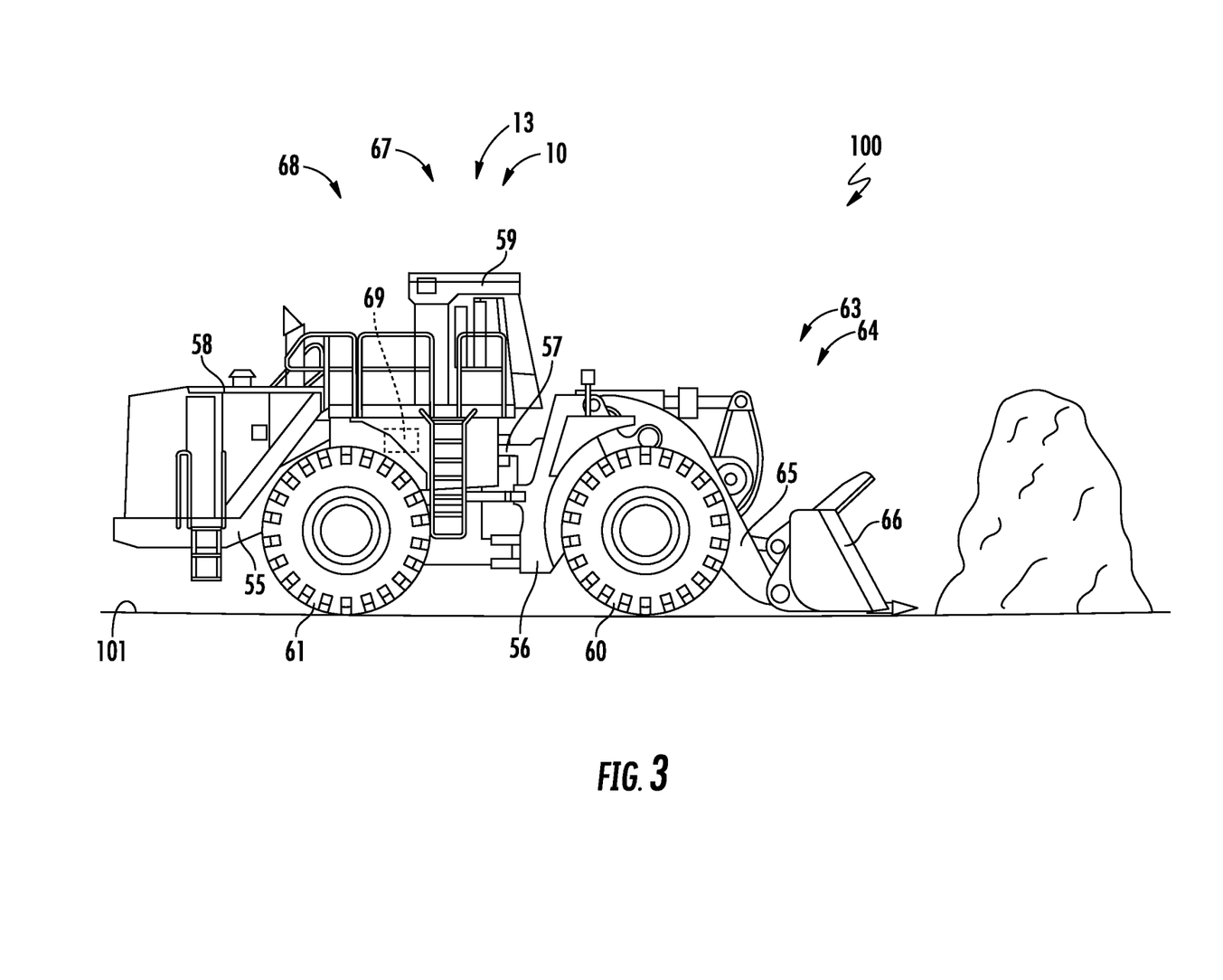
FIG. 3 depicts a schematic illustration of a wheel loader for use with the haul truck of FIG. 2.

FIG. 3 depicts another material loading machine configured as a wheel loader 13 that may be used to load a haul truck 12. The wheel loader 13 may include a body having a base portion 55 and an implement support portion 56 pivotally mounted on the base portion by an articulating joint 57. The base portion 55 houses a prime mover 58 such as an engine and an operator station or cab 59 in which an operator may be positioned. The prime mover 58 may be operatively connected to and drives a ground engaging drive mechanism such as front wheels 60 and rear wheels 61 to operate as a propulsion system. The articulating joint 57 permits the implement support portion 56 to pivot or move relative to the base portion 55 for purposes of steering the wheel loader 13.

An implement system 63 includes a linkage 64 having one or more lift arms 65 pivotally connected to the implement support portion 56. A work implement such as bucket 66 may be pivotally mounted at a distal end of the lift arms 65.

The wheel loader 13 may include a system such as an electro-hydraulic system generally indicated at 67 for operating various systems and components of the machine such as controlling steering, driving the ground engaging drive mechanism, and operation of the implement system 63. As with haul truck 12, wheel loader 13 may include a control system indicated generally at 68 and a controller 69 similar to those of the haul truck 12 and the descriptions thereof are not repeated.

During many typical material moving operations utilizing a wheel loader 13, the wheel loader is driven to a dig or loading location at the work site 100. The wheel loader 13 performs a digging operation to fill the bucket 66 with material and then is driven to a position adjacent the haul truck 12. The bucket 66 is positioned above the payload container 26 and a dump operation performed to empty the contents of bucket into the payload container. The wheel loader 13 is then driven back to the dig location and the process repeated until the haul truck 12 is filled to a desired extent.

Once the haul truck 12 is full or otherwise filled to a desired extent, the haul truck may be driven to a dump site or any other location and an empty haul truck moved to the loading area. The loaded haul truck 12 may be driven in an autonomous, semi-autonomous, or manual manner.

Regardless of whether the haul truck 12 is being operated in an autonomous, semi-autonomously or manual manner, the transmission 23 of the haul truck 12 often remains in neutral during the process of filling the payload container 26 with material and then is shifted into a drive gear 24 (e.g., first gear) before beginning a driving operation. In some instances, the process of shifting the transmission 23 into a drive gear 24 from neutral may take a relatively long period of time. In one example, the process of shifting the transmission 23 into a drive gear 24 from neutral may take as long as twenty seconds. In order to operate the machines 10 as efficiently as possible, it is often desirable to shift the transmission 23 into a drive gear 24 prior to the haul truck 12 being completely full so that the machine can leave the loading area immediately after the final loading operation has been completed.

Accordingly, the shift control system 35 may be used to determine when to shift the transmission 23 into a drive gear 24. In doing so, the loading cycle count system 34 may determine an estimated number of material loading cycles required to load or fill the payload container 26 of the haul truck 12 to a desired extent and monitor the number of material loading cycles that have been performed and provide this information to the shift control system 35. The shift control system 35 may compare the number of completed material loading cycles to the estimated number of material loading cycles required to load the haul truck 12.

After the number of completed material loading cycles is one or less than the estimated number of material loading cycles, the shift control system 35 may generate a command signal to begin a shifting operation to shift the transmission 23 into a drive gear 24, such as first gear. The shift control system 35 may also generate a braking command signal to engage the service brakes 25 or ensure that the service brakes are engaged so that the haul truck 12 remains stationary at its loading position after being shifted into a drive gear 24. Upon completing the final material loading cycle, the shift control system 35 may provide a brake release command signal to disengage the service brakes 25 to permit the fully loaded haul truck 12 to be driven to a dump location.

Figure 4:
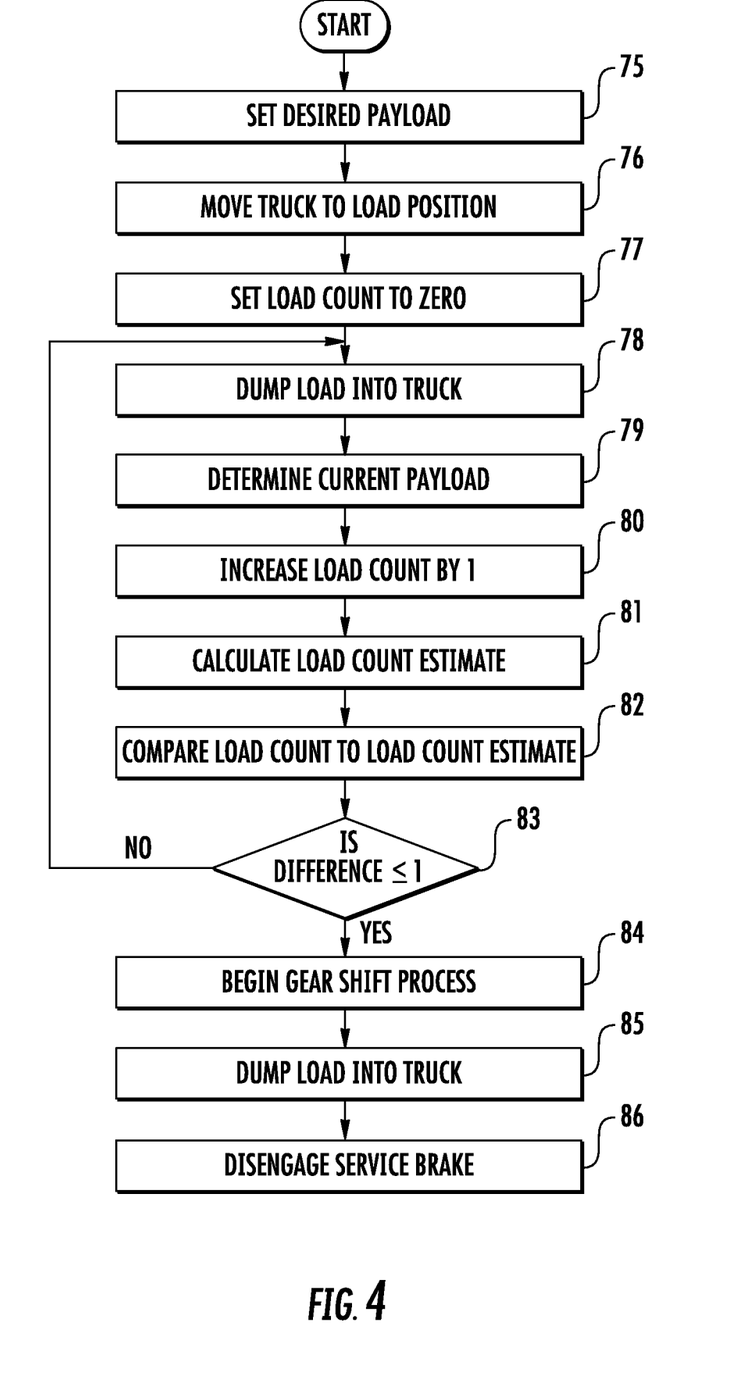
FIG. 4 depicts a flowchart illustrating a process for loading and operating a haul truck.

Referring to FIG. 4, a flowchart of a process for filling and operating a haul truck is depicted. At stage 75, the desired payload to be loaded into the haul truck may be set or stored. The haul truck 12 may be positioned at the loading location at stage 76. The load count corresponding to the number of loads dumped into the payload container 26 may be set to zero at stage 77 to designate that the procedure has begun and the haul truck 12 is empty.

At stage 78, a machine (e.g., hydraulic shovel 11 or wheel loader 13) is operated to dump a load of material into the payload container 26 of the haul truck. The payload estimation system 32 may be operated at stage 79 to determine the current payload within the payload container 26.

The load count is increased by one at stage 80 to reflect that a load has been dumped into the payload container 26. The controller 31 may determine that a dumping operation has occurred and thus increase the load count upon an increase in the payload exceeding a threshold.

Based upon the current payload, the desired payload, and the load count, the loading cycle count system 34 may determine at stage 81 the required tool count estimate (RTCE) using Equation (1) which correspond to the number of material loading cycles required to fill the payload container 26.

The shift control system 35 may compare at stage 82 the required tool count estimate (RTCE) to the actual tool count or the actual number of material moving cycles that have been completed. At decision stage 83, if the difference is greater than one, stages 78-82 are repeated and the process of filling the haul truck 12 is continued. If the difference is one or less than 1, the shift control system 35 may generate a command signal to begin the gear shift process at stage 84. In doing so, the shift control system 35 may apply or ensure that the service brakes 25 are engaged and begin the process of shifting the transmission 23 into a desired drive gear 24.

At stage 85, the final load of material is dumped into the payload container 26 of haul truck 12. A brake release command signal may be generated to disengage the service brakes 25 at stage 86 and the haul truck may be driven to its desired dump location.

If desired, the shift control system 35 may be configured to utilize a trigger delay so that the transmission 23 is not shifted into a drive gear and the service brakes 25 are not engaged immediately upon completion of the second to last material loading cycle. More specifically, the shift control system 35 may be configured to wait until the expiration of a predetermined period of time (i.e., a trigger delay) after completing the second to last material loading cycle before shifting the transmission 23 into a drive gear and engaging the service brakes 25 (or ensuring the service brakes are engaged). The predetermined period of time may be calculated or determined by the shift control system 35 or may be a predetermined fixed time period set or stored by personnel at the work site 100, at a remote location, or any other desired location. In an example in which the trigger delay is calculated, the shift control system 35 may determine the average time for each material moving cycle. In doing so, the shift control system 35 may determine the time period between each dump operation. In an example in which the trigger delay is set at a predetermined time, it may be set based upon any factors (e.g., the type of material loading machines being used to load the haul truck 12).

Figure 5:
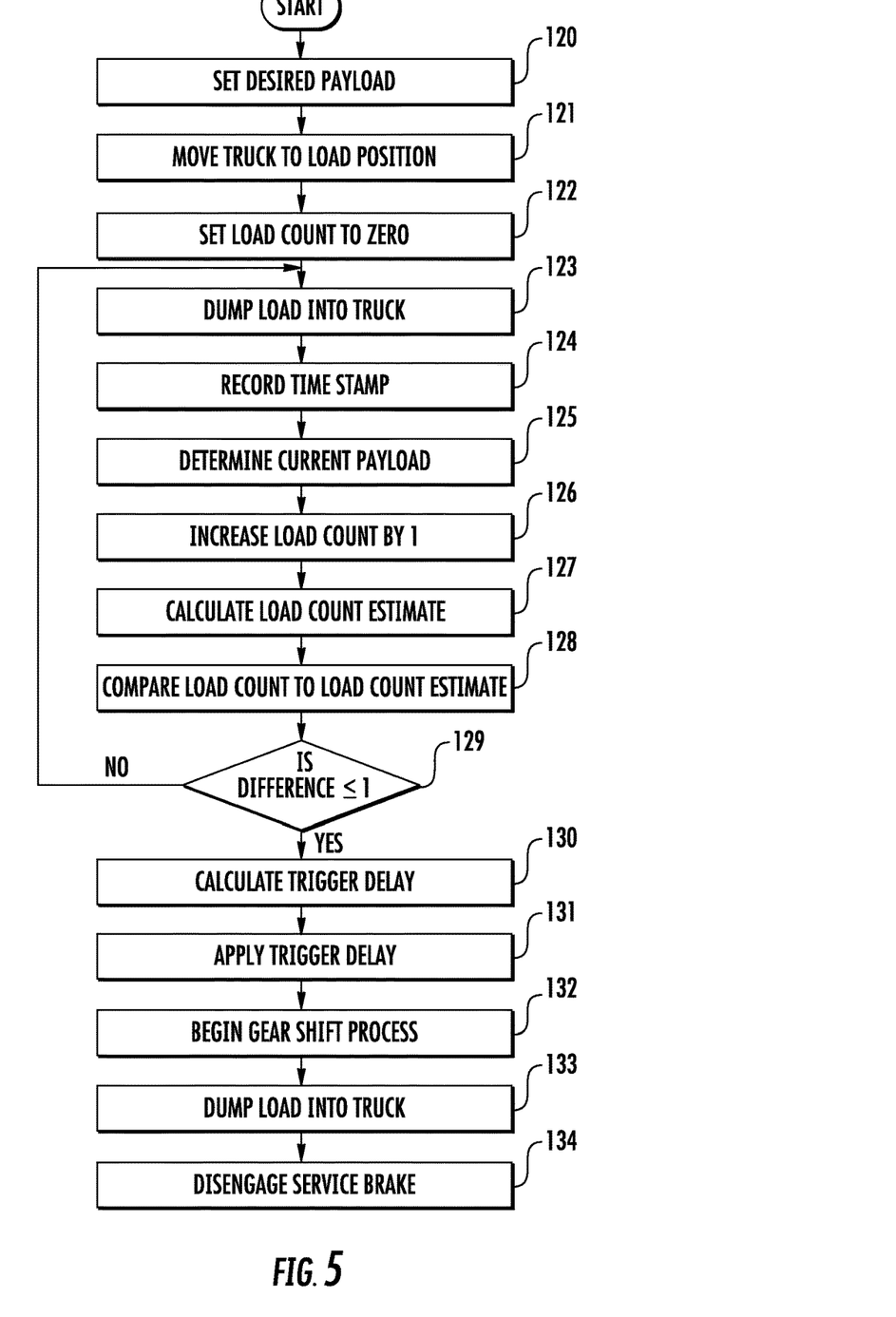
FIG. 5 depicts a flowchart illustrating an alternate process for loading and operating a haul truck.

Referring to FIG. 5, a flowchart of a process for filling and operating a haul truck utilizing a calculated trigger delay is depicted. At stage 120, the desired payload to be loaded into the haul truck may be set or stored. The haul truck 12 may be positioned at the loading location at stage 121. The load count corresponding to the number of loads dumped into the payload container 26 may be set to zero at stage 122 to designate that the procedure has begun and the haul truck 12 is empty.

At stage 123, a machine (e.g., hydraulic shovel 11 or wheel loader 13) is operated to dump a load of material into the payload container 26 of the haul truck. A time stamp may be recorded at stage 124 corresponding to the time at which the load was dumped. The payload estimation system 32 may be operated at stage 125 to determine the current payload within the payload container 26.

The load count is increased by one at stage 126 to reflect that a load has been dumped into the payload container 26. The controller 31 may determine that a dumping operation has occurred and thus increase the load count upon an increase in the payload exceeding a threshold.

Based upon the current payload, the desired payload, and the load count, the loading cycle count system 34 may determine at stage 127 the required tool count estimate (RTCE) using Equation (1) which correspond to the number of material loading cycles required to fill the payload container 26.

The shift control system 35 may compare at stage 128 the required tool count estimate (RTCE) to the actual tool count or the actual number of material moving cycles that have been completed. At decision stage 129, if the difference is greater than one, stages 123-128 may be repeated and the process of filling the haul truck 12 is continued. If the difference is one or less than 1, the shift control system 35 may calculate at stage 130 the trigger delay corresponding to a time delay that will occur before the gear shift process begins. To calculate the trigger delay, the shift control system 35 may determine the average time between the time stamps saved at stage 124 during each material dumping cycle.

At stage 131, the shift control system 35 may apply the trigger delay by starting a counter for a timer period corresponding to the trigger delay. Upon completion of the trigger delay, the shift control system 35 may begin the gear shift process at stage 132. In doing so, the shift control system 35 may generate a brake command signal to apply or ensure that the service brakes 25 are engaged and generate a command signal to begin the process of shifting the transmission into a desired drive gear.

At stage 133, the final load of material is dumped into the payload container 26 of haul truck 12. The service brakes 25 may be disengaged at stage 134 and the haul truck driven to its desired dump location.

In an embodiment in which the trigger delay is a fixed time period, the process of the flowchart of FIG. 5 may be modified by adding a stage similar to stage 120 in which the trigger delay period is set or stored, and deleting stages 124 and 130.

In embodiments, the payload estimation system 32, the loading cycle count system 34, and/or the shift control system 35 may be self-contained or disposed on haul truck 12 so that the controller 31. For example, if the loading cycle count system 34 is disposed on haul truck 12, the on-board controller may determine the required tool count estimate (RTCE) and the load count without input from other off-board systems.

In other embodiments, the payload estimation system 32, the loading cycle count system 34, and/or the shift control system 35 may receive input from off-board systems such as those on the material loading machines (e.g., hydraulic shovel 11, wheel loader 13). As an example, a hydraulic shovel 11 or may include a bucket load estimation system indicated generally at 50 in FIG. 1 configured to determine an estimate of how much material is contained within each bucket of material being loaded into the haul truck 12. In one embodiment, the amount of material contained within each bucket load as well as the load count may be transmitted wirelessly to the haul truck 12 from the hydraulic shovel 11.

The controller 31 of the haul truck may use the transmitted information to determine the current payload by summing or totaling the load added during each material moving cycle. After calculating the current payload, the controller 31 may use the load count to determine the required tool count estimate (RTCE) and otherwise control the haul truck 12 in accordance with the process depicted in FIGS. 4-5.

In embodiments, other aspects of the processes depicted in FIGS. 4-5 may be performed off-board the haul truck 12. In an example, the required tool count estimate (RTCE) may be determined off-board the haul truck 12. In another example, a trigger delay may be determined off-board the haul truck 12.

Figure 6:
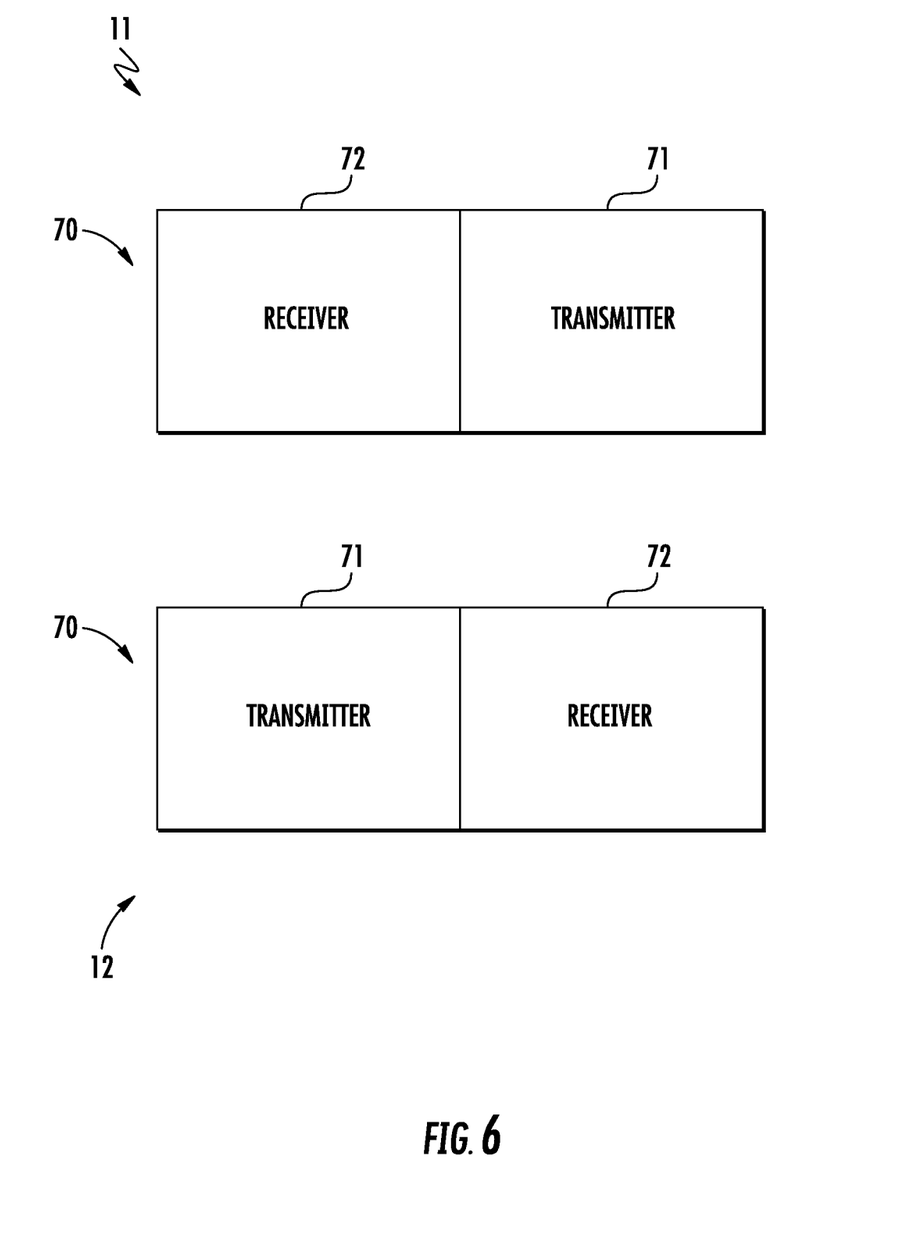
FIG. 6 depicts a schematic illustration of a wireless communications system

If aspects of the processes of FIGS. 4-5 are performed off-board, each of the material loading machine (e.g., hydraulic shovel 11, wheel loader 13) and the haul truck 12 may include a wireless communications system 70 (FIG. 6) to permit wireless transmission of a plurality of instructions and information between the material loading machine and the haul truck 12 as well as permit communication with other machines and systems remote from the material loading machine and the haul truck. In one embodiment, each wireless communications system 70 may include a transmitter 71 for transmitting signals and a receiver 72 for receiving signals from a transmitter system of another wireless communications system. In some instances, the transmitter 71 and the receiver 72 may be combined as a transceiver system. In some embodiments, the haul truck 12 may only include a receiver system and the material loading machine may only include a transmitter system.

Wireless communications systems 70 may implement or utilize any desired system or protocol including any of a plurality of communications standards. The desired protocols will permit communication between the material loading machine 10 and the haul truck 12 as well as any other desired machines or systems. Examples of wireless communications systems or protocols that may be used by the wireless communications systems 70 include a wireless personal area network such as Bluetooth® (e.g., IEEE 802.15), a local area network such as IEEE 802.11b or 802.11g, a cellular network, or any other system or protocol for data transfer. Other wireless communications systems and configurations are contemplated.

INDUSTRIAL APPLICABILITY

The industrial applicability of the systems described herein will be readily appreciated from the forgoing discussion. The foregoing discussion is applicable to machines 10 such as haul trucks 12 that operate to move material. Such machines 10 may be used at a mining site, a landfill, a quarry, a construction site, a roadwork site, a forest, a farm, or any other area in which material movement is desired.

As discussed herein, a payload estimation system 32 may determine a current payload within a payload container of a haul truck 12, a loading cycle count system 34 may determine a number of material moving cycles required to fill the payload container to the current level, and a shift control system 35 may determine when to begin a shifting process to begin shifting transmission 23 into a drive gear 24 based upon information from the payload estimation system and the loading cycle count system. By shifting the transmission 23 into a drive gear 24 at a desired time, the foregoing systems are operative to increase the efficiency of a material moving process while reducing wear on haul trucks 12 that are operative to move material from one location to another.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for controlling a drive operation of a machine, comprising:
a payload container disposed on the machine and operative to haul a material;
a load sensor configured to generate load signals indicative of a load;
a transmission operative to control propulsion of the machine, the transmission including a drive gear; and
controller configured to:
access a desired payload of the payload container;
receive load signals from the load sensor;
determine a current payload disposed in the payload container based upon the load signals;
determine a number of completed material loading cycles of a work implement, the work implement being used to load the payload container;
determine an estimated number of material loading cycles of the work implement required to load the payload container until the payload container reaches the desired payload based upon the desired payload of the payload container, the current payload, and the number of completed material loading cycles;
compare the number of completed material loading cycles to the estimated number of material loading cycles; and
after the number of completed material loading cycles is one or less than the estimated number of material loading cycles, generate a command signal to begin a shifting operation to shift the transmission into the drive gear.

2. The system for controlling a drive operation of a machine of claim 1, wherein the load signals are indicative of the load in the payload container and the load in the payload container corresponds to the current payload.

3. The system for controlling a drive operation of a machine of claim 1, wherein the load sensor is disposed on the machine.

4. The system for controlling a drive operation of a machine of claim 1, wherein the load sensor comprises a pressure sensor.

5. The system for controlling a drive operation of a machine of claim 1, wherein the load signals are indicative of the load in the work implement being utilized to load the payload container.

6. The system for controlling a drive operation of a machine of claim 5, wherein the load sensor is disposed on another machine comprising the work implement.

7. The system for controlling a drive operation of a machine of claim 5, wherein the controller is configured to determine the load in the work implement for each material moving cycle and determine the current payload disposed in the payload container based upon the load in the work implement for each material moving cycle.

8. The system for controlling a drive operation of a machine of claim 1, wherein upon determining that the number of completed material loading cycles is one or less than the estimated number of material loading cycles, the controller is configured to apply a trigger delay prior to generating the command signal to begin the shifting operation.

9. The system for controlling a drive operation of a machine of claim 8, wherein the trigger delay is determined based upon an average time between completed material loading cycles.

10. The system for controlling a drive operation of a machine of claim 8, wherein the trigger delay corresponds to a predetermined fixed time period.

11. The system for controlling a drive operation of a machine of claim 10, wherein the predetermined fixed time period corresponds to a type of machine being used to load the machine.

12. The system for controlling a drive operation of a machine of claim 1, further comprising service brakes configured to control braking of the machine and the controller is configured to generate a braking command signal to control the service brakes.

13. The system for controlling a drive operation of a machine of claim 12, wherein the controller is further configured to generate a brake release command signal to disengage the service brakes after completing a final material loading cycle.

14. The system for controlling a drive operation of a machine of claim 1, wherein the payload container has an open top to permit material to be loaded therein from above the payload container.

15. A method of controlling a drive operation of a machine, comprising:
accessing a desired payload of a payload container disposed on the machine and operative to haul a material;
receiving load signals from a load sensor indicative of a load;
determining a current payload disposed in the payload container based upon the load signals;
determining a number of completed material loading cycles of a work implement, the work implement being used to load the payload container;
determining an estimated number of material loading cycles of the work implement required to load the payload container until the payload container reaches the desired payload based upon the desired payload of the payload container, the current payload, and the number of completed material loading cycles;

comparing the number of completed material loading cycles to the estimated number of material loading cycles;

after the number of completed material loading cycles is one or less than the estimated number of material loading cycles, generating a command signal to begin a shifting operation to shift a drive gear of a transmission, the transmission being operative to control propulsion of the machine.

16. The method of claim 15, wherein upon determining that the number of completed material loading cycles is one or less than the estimated number of material loading cycles, applying a trigger delay prior to generating the command signal to begin the shifting operation.

17. The method of claim 16, wherein the trigger delay is based upon an average time between completed material loading cycles.

18. The method of claim 16, wherein the trigger delay corresponds to a predetermined fixed time period.

19. The method of claim 15, further comprising disengaging service brakes of the machine after completing a final material loading cycle, the service brakes being configured to control braking of the machine.

20. A machine, comprising:
a prime mover;
drive wheels;
a transmission operatively connected to the prime mover and the drive wheels to control propulsion of the machine, the transmission including a drive gear;
a payload container disposed on the machine and operative to haul a material;
a load sensor configured to generate load signals indicative of a load; and
a controller configured to:
   access a desired payload of the payload container;
   receive load signals from the load sensor;
   determine a current payload disposed in the payload container based upon the load signals;
   determine a number of completed material loading cycles of a work implement, the work implement being used to load the payload container;
   determine an estimated number of material loading cycles of the work implement required to load the payload container until the payload container reaches the desired payload based upon the desired payload of the payload container, the current payload, and the number of completed material loading cycles;
   compare the number of completed material loading cycles to the estimated number of material loading cycles;
   after the number of completed material loading cycles is one or less than the estimated number of material loading cycles, generate a command signal to begin a shifting operation to shift the transmission into the drive gear.

* * * * *